United States Patent

Fillard et al.

[11] Patent Number: 5,770,856
[45] Date of Patent: Jun. 23, 1998

[54] NEAR FIELD SENSOR WITH CANTILEVER AND TIP CONTAINING OPTICAL PATH FOR AN EVANESCENT WAVE

[75] Inventors: Jean Pierre Fillard, Saint Gely Du Fesc; Michel Castagné, Clapiers; Jacques Bonnafé, Montpellier, all of France

[73] Assignee: British Technology Group Ltd, London, England

[21] Appl. No.: 583,051
[22] PCT Filed: Jul. 22, 1994
[86] PCT No.: PCT/GB94/01586
  § 371 Date: Feb. 23, 1996
  § 102(e) Date: Feb. 23, 1996
[87] PCT Pub. No.: WO95/03561
  PCT Pub. Date: Feb. 2, 1995

[30] Foreign Application Priority Data

Jul. 22, 1993 [EP] European Pat. Off. .............. 93305786

[51] Int. Cl.$^6$ ....................................................... H01J 3/14
[52] U.S. Cl. ........................................... 250/234; 250/306
[58] Field of Search ............................... 385/12; 250/306, 250/234, 216, 227.26, 227.32, 227.28, 227.24

[56] References Cited

U.S. PATENT DOCUMENTS

| | | | |
|---|---|---|---|
| 5,105,305 | 4/1992 | Betzig et al. ............................ | 359/368 |
| 5,166,520 | 11/1992 | Prater et al. ............................. | 250/306 |
| 5,289,004 | 2/1994 | Okada et al. ............................ | 250/306 |
| 5,304,795 | 4/1994 | Fujihira et al. ......................... | 250/234 |
| 5,354,985 | 10/1994 | Quate ..................................... | 250/234 |

FOREIGN PATENT DOCUMENTS 403766   12/1990   European Pat. Off. .

*Primary Examiner*—Edward P. Westin
*Assistant Examiner*—Kevin Pyo
*Attorney, Agent, or Firm*—Cushman Darby & Cushman IP Group of Pillsbury Madison & Sutro LLP

[57] ABSTRACT

The disclosed optical device includes a probe which is integrally supported on a cantilever which defines an optical path extending to an external device which may carry an optical processor.

In a preferred embodiment the device has an optical path which is capable of guiding an evanescent wave to the external device. The device overcomes a problem with prior art Scanning Tunnelling Microscopes in that, by utilizing evanescent waves, it enables access to the so called mesoscopic range between approximately $1 \times 10^{-10}$ m←$50 \times 10^{-10}$ m (1Å–50Å). In an alternative embodiment the invention permits manipulation of microscopic particles by utilising the probe. The probe may also act as a sensor.

5 Claims, 13 Drawing Sheets n = 1.5 n = 3.5

NEAR FIELD SENSOR WITH CANTILEVER AND TIP CONTAINING OPTICAL PATH FOR AN EVANESCENT WAVE

This application claims benefit of international application PCT/GB 94/01586 filed Jul. 22, 1994.

This Invention relates to optical equipment and more particularly, though not exclusively, to optical devices and equipment with integrated photodetection means and/or processing means; or devices or equipment having a direct link to processing means, hereinafter referred to as an intelligent optical sensor.

Near field Scanning Tunneling Microscopy (STM) and related techniques have been proposed during the last ten years to image material surfaces at a scale below the traditional, optical microscopy range, that is at, or around, the atomic scale.

Scanning Near Field Microscopy has become well established in the ten years since the invention of Scanning Tunneling Microscopes (STM) by the Nobel prize winners Binnig and Rohrer (1984). The basic idea was to control the position of a probe (or antenna) in the vicinity of a surface, using high precision piezo-electric micro-actuators and feedback electronic control of a tunnel electron current between the surface under inspection and the probe (or antenna). More generally a so-called "proximity function" was used to control the distance between the probe and the surface, as with Atomic Force Microscopy (AFM) and related techniques.

Scanning Tunneling Microscopes have made it possible to obtain microscope images of very high resolution, without using either destructive electrons or a vacuum. More recently it has become possible, with computer assistance, to manipulate individual atoms in order to build tiny objects. The impetus is therefore now on micro-fabrication and corresponding instruments able to operate on such a micro scale.

Scanning Tunneling Microscopes (STM) and related techniques suffer from their extreme specification. Thus although they are very well adapted to the atomic scale, they are not easily extended to larger dimensions because of the limited size of the so called critical distance $d_c$ of the proximity function. Typically the critical distance, $d_c$, is in the range 0.1 nm<$d_c$<5 nm and it is within this range that STM's are intended to operate. Mesoscopic objects, which are typically of the order of tens of nanometers (hundreds of Å), cannot easily be observed by STM, especially if the surface to be inspected is atomically rough. More recently a new technique has been proposed which relies on the so called photon near field proximity function instead of the electronic one. This technique is fairly easily adapted to the mesoscopic domain (10 nm<$d_c$<250 nm) because of a larger value of $d_c$.

Even more recently a particular technique has arisen which is called Photon Scanning Tunneling Microscopy (PSTM) or Scanning Near Field Optical Microscopy (SNOM). These two techniques, PSTM and SNOM, are related by the ability of very small apex optical systems to receive, or to emit, photons in the near field. For the sake of simplicity the present invention will be described with reference to the case of PSTM, given that SNOM situation operates in a substantially reciprocal manner, it will be appreciated that the invention is also applicable to SNOM.

The main difference between classical STM and PSTM relies on the much extended proximity function of PSTM, which makes it possible to control the position of a probe in an approximate range of 10 to 200 nm instead of 0.1 nm to 5 nm for STM. This is an advantage if larger scale investigations are intended on a micron scale.

It is emphasised that very small objects, that is smaller than about 0.5 μm in size, cannot be seen using classical optical means of microscopy, nor can they be studied conveniently by electron microscopy. Thus making use of, observing and/or manipulating such small objects, has been extremely difficult, if not impossible. Also because of the relatively large "size" of a photon it was very difficult to establish a specific relationship with small light emitters such as nanometric lasers or luminescent molecules. Similarly the problem is experienced with localised receivers.

Thus exploration, monitoring, observation, manipulation and/or measurement at the nanoscale, whilst maintaining a relationship with the external, macroscopic world requires adapted, automated, intelligent tools which can compensate for the deficiency of human vision and dexterity at the nanoscale.

Some types of optical scanners which could be considered as intelligent optical sensors are already in existence. One such device is described in European Patent Application EP-A1-0509716 (CANON) and is an Atomic Force Microscope (AFM). An AFM detects an atomic force between a specimen and a probe which is in the region of about 1 nm of the surface of a specimen. The device measures the amount of displacement of a cantilever, which supports an optical probe, and utilises an integrated optical circuit to control the position of the probe. The device detects a change in luminous intensity and uses this to calculate displacement in one direction. The arrangement involves several mirrors and reflections of light as well as gratings, to split and combine light beams.

U.S. Patent U.S.-A1-5138159 describes an arrangement which automatically controls the distance between a probe of a Scanning Tunneling Microscope (STM) and the surface of a specimen which is being observed.

European Patent Application EP-A1-0403766 describes an arrangement which attempts to remove measurement errors arising as a result of temperature drift and vibrations.

The nanoscopic world is rich in applications, with a large emphasis on photon contribution. Studies have been made of electronic "nanocircuits", which has lead to studying individual electrons and related electromagnetic waves. Quantum Electro Dynamics (QED) is operated with new hybrid devices. These are hybrids of classical electronic and optic technologies such as interferometers and electron turnstiles. Another area is Macromolecular synthesis, which also allows controlled molecular structures to be built which can be used as individual circuits, resonators or quantum wells. Nanoscopic devices have applications in the study of microbiology within intra cellular studies. This enables "in vivo" microscopy and microfabrication of cellular matter. An important area is the study of DNA.

German Offenlegungschrift DE-A1-4231426 describes a device formed from a Gallium Arsenide (Ga As) wafer or slab so as to form an optical sensor. The device is a microscopic device which cannot operate at the reduced scale of an Atomic Force Microscope.

In all the above mentioned areas it becomes very important to have suitably adapted technical means or tools and it was with this and other problems in mind that the present invention arose.

It is an object of the present invention to provide a sensor with nanometric resolution which is simpler than the devices described above and which avoids limitations of the devices described above. None of the aforementioned documents describes a system capable of achieving this.

It is another object of the present invention to provide an optical sensor, for inspection or profiling of materials, especially those with a high refractive indices, and in particular semiconductor materials, to a resolution of between 1 nm to approximately 200 nm with a high detection yield and an excellent noise immunity.

It is a further object of the present invention to provide an optical sensor for achieving an optical connection between nanometric-size objects, such that the optical sensor has a sharp lateral resolution, a high collection yield, a high optical transfer and detection yield, and excellent noise immunity.

According to the present invention there is provided an intelligent optical sensor, including a cantilever supporting a probe, the probe and cantilever having an optical path, at least part of which path is adapted to transmit an evanescent wave, the path extending between a tip of the probe to an external connection of the sensor.

Preferably the probe is optically coupled to the cantilever.

According to another aspect of the present invention there is provided an intelligent optical sensor including a cantilever supporting a probe, the probe and cantilever having an optical path, at least part of the path being adapted to convey an optical wave, the path extending to a tip of the probe and to an external connection of the sensor.

Preferably the tip of the probe is pyramidal in shape. That is the tip may comprise a square or triangular-based pyramid, which is advantageously integrally formed with the probe, by which is meant that the probe and tip are formed from the same material. Most preferably the tip is of square-based pyramidal form.

Alternatively, or additionally, at least part of the optical path may convey an optical wave. However, the cantilever may be of semiconductor material transparent at the evanescent wavelength.

One or more external connections may include an optoelectronic transducer. The optical sensor may include an integrated circuit to control light within the optical path. Light may be emitted and/or received at said tip and travel over at least a portion of said optical path.

According to another aspect of the present invention there is provided an intelligent optical sensor including a cantilever and a probe supported thereon, the probe having a probe tip, which probe and probe tip have a first optical path, the cantilever providing a second optical path, arranged in optical communication with the first optical path, the device further including a control element to exercise control of probe tip optical activity via at least one of said optical paths, and a further optical path between said tip and external connection means external to said further path, light being able to pass in at least one direction along each said path.

The optical sensor may be adapted to permit light to pass in two or more different directions along the path. There may be an optical coupling to the probe from an external optical apparatus. This coupling may provide the external connection.

The sensor may be operable to perform at least one of forming a PSTM image, forming an SNOM image, delivering photons to a specific site and receiving photons from a specific site.

The sensor may operate as a sensor, a scanner or a micro-robot, or any combination of these.

Preferably the intelligent optical sensor has a lateral precision of imaging, or illuminating, objects in the order of 10 nm to 250 nm. Preferably the optical characteristic is the intensity of light passing along the optical path. However, it may be the polarisation and/or phase of the light and/or wavelength of the light. The cantilever, supporting the probe, and tip may be fabricated using conventional micro-electronic techniques.

The optical sensor may be connected to one or more actuators. The or each actuator may comprise a piezoelectric device.

The present invention provides an intelligent optical sensor capable of performing at least the following tasks: observing the nanoscopic environment; recognizing relief at a nanoscopic scale; and identifying materials and structures, such as ridges, grooves, mesas or the like. Furthermore the optical sensor is able to bring an optical conductor, defining an optical path, to a position; and/or to convey a light beam exactly to, or from, a predetermined position.

The intelligent optical sensor, for example when used as a scanner, is advantageously fabricated using conventional micro-electronic techniques. It can integrate several important functions on the same substrate by using compact integrated or hybride structures. These include:

(a) a semiconductor to make an AFM or a PSTM distance control, the latter using a near infra red (NIR) wavelength illumination $\lambda_1$; and/or (b) an optical sensor located in the immediate vicinity of the tip and tuned to a first wavelength $\lambda_1$; and/or (c) an electronic amplifier and signal processor which may be digital; and/or (d) a data transfer link for providing a link to artificial intelligence external to the sensor; and/or (e) a wavelength decoupled optical connection allowing an optical transfer at a wavelength $\lambda_2$ decoupled from $\lambda_1$.

An optical sensor preferably comprises a cantilever formed from a semiconductor material transparent at least at the evanescent wavelength. Alternatively the optical sensor has a probe which is formed from a transparent semiconductor material.

Preferably an optical sensor receives light which is emitted and/or received at said tip and travels over at least part of said path.

Preferably an optical sensor is arranged to guide photons between said tip and said external connection.

Preferably an optical sensor has an external connection and includes an optoelectronic transducer. Alternatively an optical sensor includes an optoelectronic integrated circuit for light in said path. The optical sensor may have a selective circuit which is tuned to a specific wavelength. The optical sensor may comprise means for supporting light of more than one wavelength. The means may be arranged to discriminate between said wavelengths.

The optical sensor may comprise respective path for each of said wavelengths.

Additionally means may be provided which comprises an integrated optical detector and/or amplifier, and/or an analog to digital converter and/or a digital signal processor.

An optical sensor including means to control the position of said tip with respect to a surface of interest, in the near field region by response, in operation, to an evanescent wave in said optical path.

An optical sensor may include means to control the position of said tip with respect to a surface of interest in the near field region formed at least in part by an integrated optical detector and amplifier, an analogue-to-digital converter and a digital signal processor.

An optical sensor may comprise means to control the position of its tip in response to a recorded atomic force.

Alternatively means to control the position of said tip is responsive to a photon tunnelling image at the evanescent wavelength to control tip position to a predetermined position.

An optical sensor as described, in which said means to control the position of said tip is effective to permit the delivery and/or detection of an optical signal at a predetermined position and time.

The sensor preferably has a lateral precision of imaging, or illuminating, objects in the order of 10 nm to 250 nm and may also be responsive to the intensity of light passing along the or each optical path. Means may be provided to enable the sensor to be responsive to the polarisation and/or phase of light and/or wavelength of light. The sensor may include at least one actuator, which may comprise a piezoelectric device.

Embodiments of the present invention are now described with general reference to the Figures and with particular reference to FIGS. 9 to 18, in which.

Figure 1:
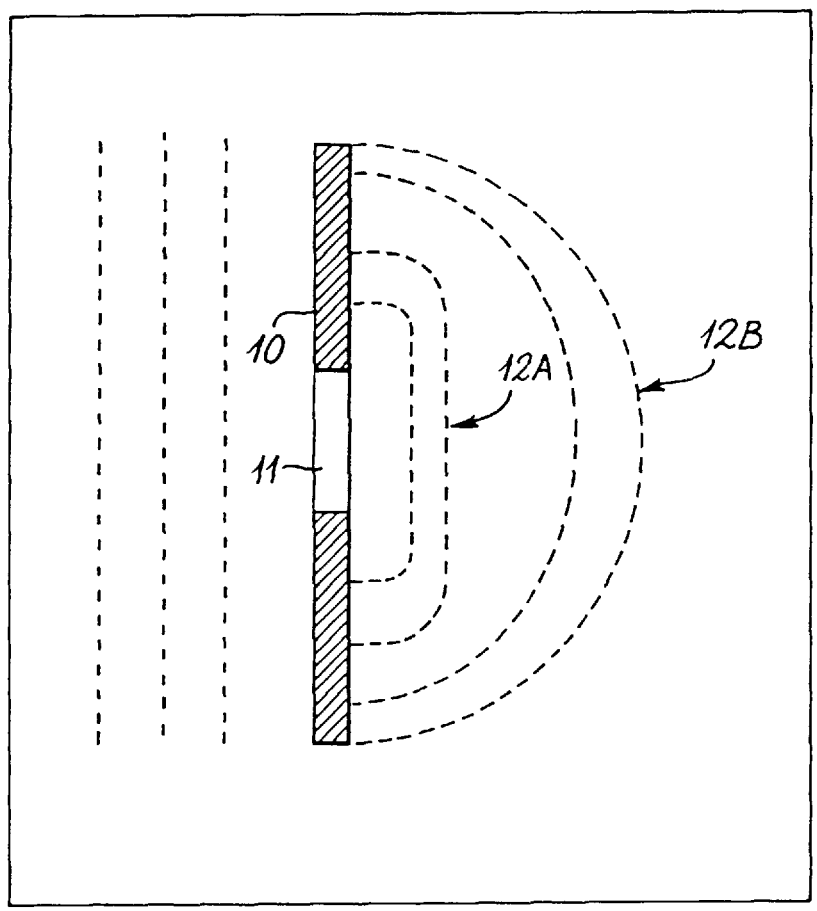
FIG. 1 is a sketch illustrating the basic principle of diffraction by a sub-wavelength hole.

FIG. 1 shows as a model and is useful in considering an object having a characteristic dimension less than illuminating wavelength $\lambda_a$, In this situation the Maxwell equations are applied in order to calculate characteristics of scattered waves. Dual situations of a small scattering particle, or a small circular hole in a shield, give rise to dual conclusions. A shield 10, in which a hole 11 is defined, the circular hole 11 having a nanometric apex, is illuminated by a propagating plane wave with wavelength $\lambda_a$. The details of the shape of the hole 11 are transmitted to the scattered wave as long as the distance from the hole 11 (or object), is in the same range as its size. This is known as the near field and occurs close to the hole in the vicinity 12A. This distance is typically within a region less than the wavelength. At greater distances, the propagating wave becomes spherical and does not convey any information as to the shape of the hole 11. Region 12B is the "far field".

The hole 11 can be employed as a structuring element and can effectively be used for scanning imaging. The hole 11 can be used either as a point light source as shown in FIG. 1 or as a point receiver (not shown) for exploring a light field scattered by a physical object (not shown). The former simplified situation corresponds to SNOM, the latter to PSTM. In reality both SNOM and PSTM require the same condition that the hole 11 has to be at a very short distance from the specimen under inspection.

For the sake of simplicity only the case of PSTM is considered below, it being understood that the same conclusions and principles can be incorporated in SNOM.

Figure 2A:
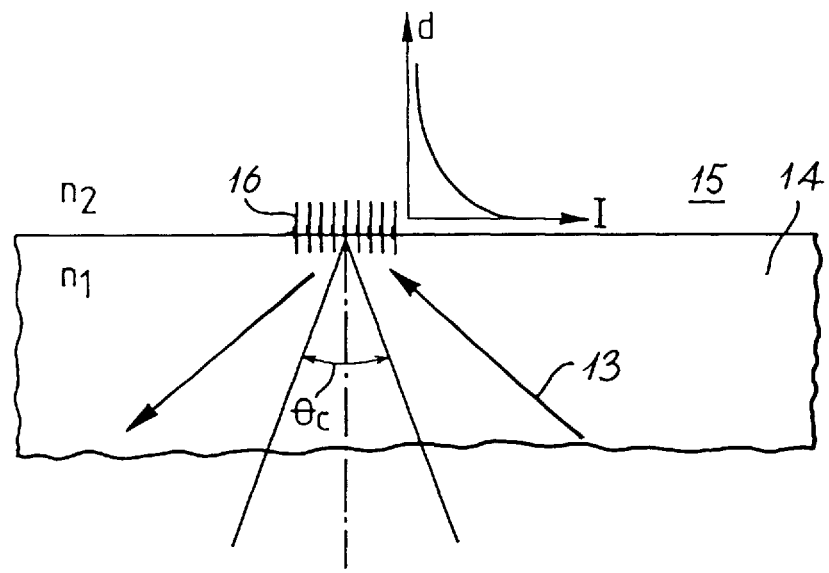
FIG. 2a and 2b show the basic principle of Photon Scanning Tunneling Microscopy (PSTM)

The basic principle of PSTM is shown in FIG. 2a. A light beam 13 is shown propagating in an homogenous dielectric material 14. The beam 13 is reflected at an interface with a second, different, material 15 having a lower refractive index than material 14, if the angle of incidence of beam 13 is greater than the critical angle of refraction at the interface. Such total internal reflection generates in the second material 15, an evanescent wave 16 which passes along the interface of the two materials 14 and 15 with an amplitude (I) which rapidly decreases with the distance (d) to the interface. The relationship between intensity, distance and polarisation angle of incidence light is shown in more detail in the graphs in FIGS. 3 and 4. The critical distance $d_c$ of the exponential function, which governs this rapid decrease in amplitude is found to lie in the range 10–300 nm. It is understood that this distance depends on the angle of incidence and the refractive indices of the materials. Therefore by selective variation of these variables the critical distance ($d_c$) may be varied within a given range as depicted by the graph in FIGS. 3 and 4.

Usually the second material 15 is simply air whose refractive index is 1 (n=1). If a third dielectric material is placed in the near field region of evanescent wave 16, electrons from the third material can couple with the electromagnetic wave and give rise to a propagating mode. A transmitted light beam is then created in the third medium, through the air gap. The situation is similar to the electron tunneling effect through a potential barrier and is depicted diagrammatically in FIG. 2b.

Figure 2B:
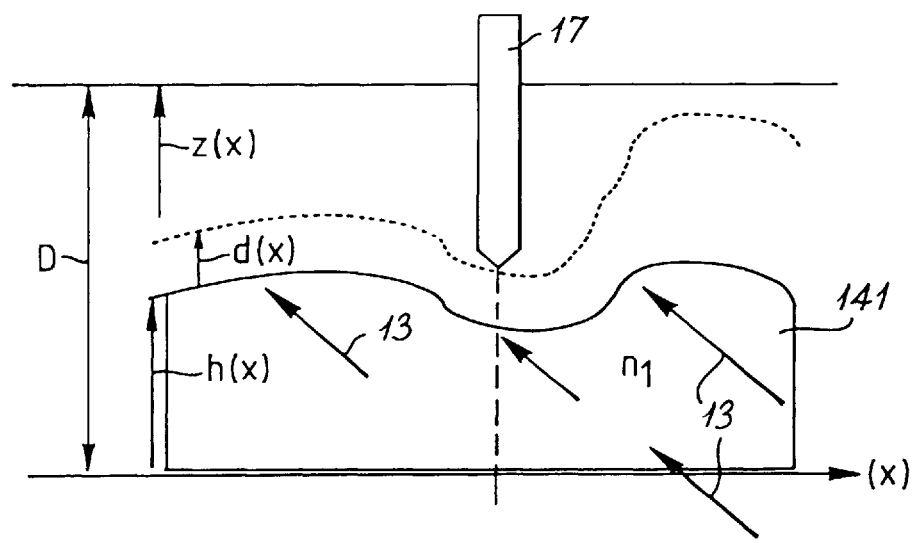

FIG. 2(b) shows a dielectric probe 17, for example an optical fibre, which can capture an evanescent wave (not shown) from a sample material 141, illuminated as described above. Capturing the evanescent wave generates a photon flux in the probe 17. The smaller the gap d(x), between the tip of probe 17 and the surface of the material 141, the stronger is the collection yield. This phenomenon is called Frustrated Total Internal Reflection (FTIR) because energy in a transmitted light beam is deducted from energy in the reflected beam.

Optical probe 17 can be scanned over the surface of the sample material in the x-direction of material 141. Probe 17 may also be moved in perpendicular directions to follow relief of the surface. Control and feedback means (not shown) may be used to maintain a constant photon flux in the optical probe 17. Monitoring the photon flux and maintaining this photon flux at a constant, enables a profile of the surface to be obtained.

PSTM can be considered from many points of view as the photonic equivalent of STM. There are two important measurements which can be obtained. The first is measurement of information pertaining to the topography of the surface of the sample material at a nanoscale. The second is that information pertaining to the chemical nature of the material which is locally related to the critical distance ($d_c$) and to the refractive index (n).

Figure 6:
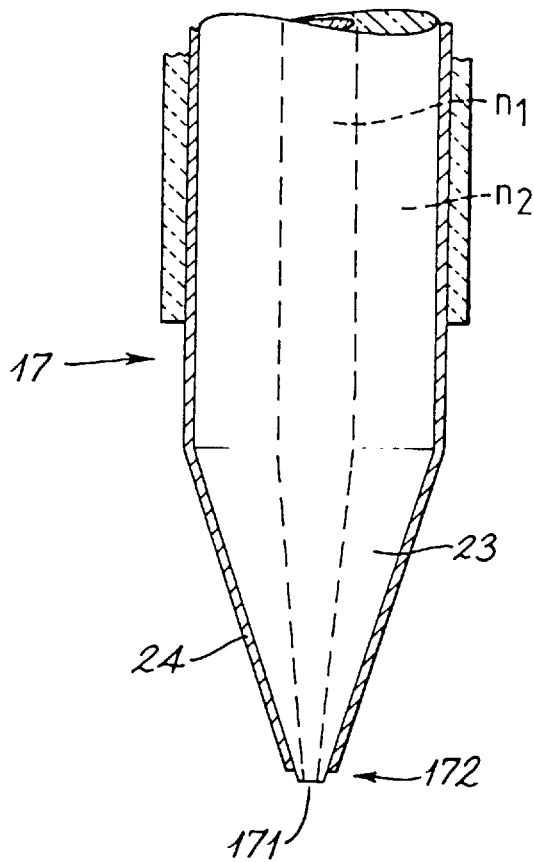
FIG. 6 is a diagrammatical section of a probe of a PSTM optical fibre device, acting as a sensor.

It has been reported that the lateral resolution and precision of PSTM is primarily affected by the dimensions of the apex 171 of the optical probe 17, as shown in FIG. 6. The apex 171 protrudes beyond tip 172 of probe 17. The distance d(x) the tip 172 has to be placed, with respect to a surface of a sample material (not shown), must be in a similar range to the distance the apex 171 protrudes beyond the tip 172. It has been shown that the exact shape of the tip 172 has little effect on the capture yield. Thus it is possible for the purpose of calculations, to consider the tip 172 as being flat. Using this approximation the transmitted intensity of coupled photon flux has been calculated for PSTM glass systems and also for semiconductor systems in the near infra red (NIR) region of transparency. The latter material is a special case because of its relatively high refractive index.

Figure 3:
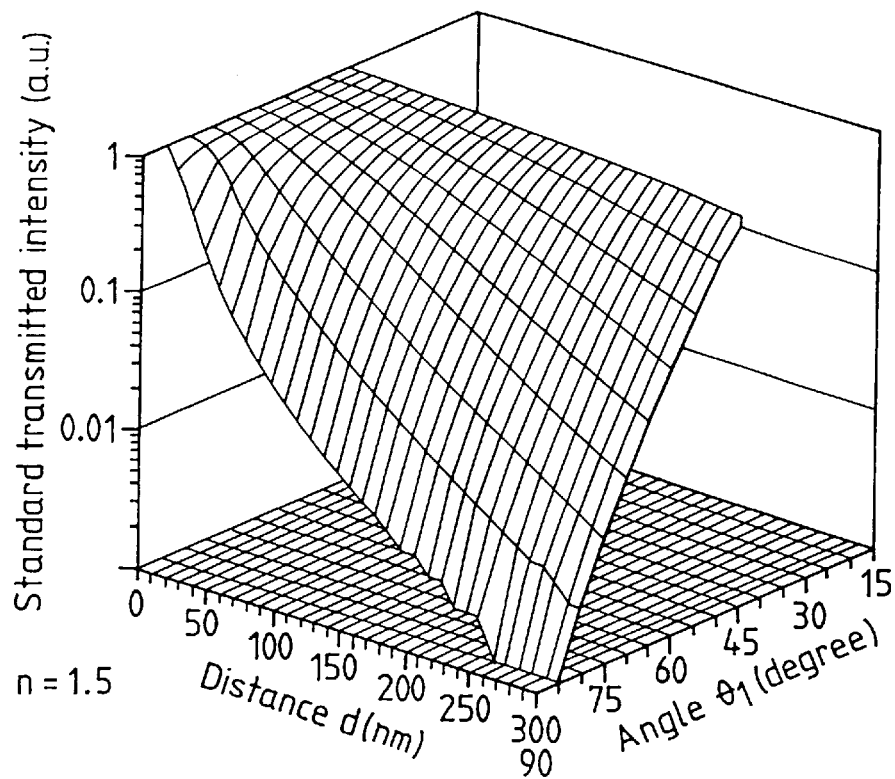
FIG. 3 is a graph showing transmitted intensity of an evanescent wave (parallel polarisation) in a glass like system (n=1.5) as a function of the distance (d) from the interface surface and the incidence angle (θ)
Figure 4:
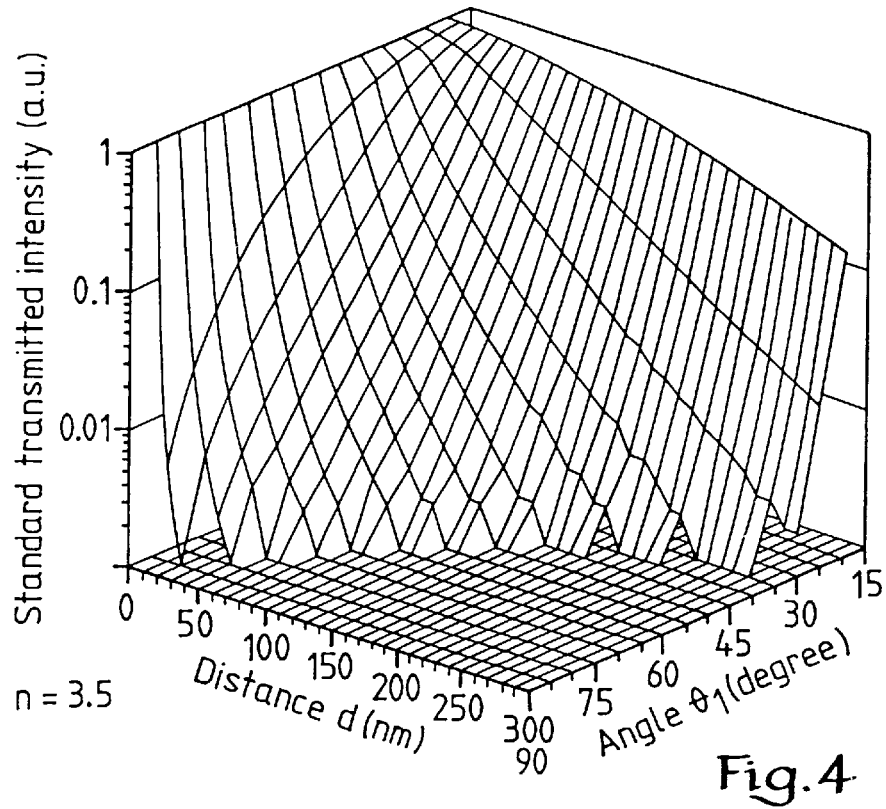
FIG. 4 is a graph showing transmitted intensity of an evanescent wave with parallel polarisation in a semiconductor system, (n=3.5) as a function of the distance (d) from the interface surface and the incidence angle (θ)

Examples are given in the graphs shown in FIGS. 3 and 4 respectively for n=1.5 (glass sample and tip) and for n=3.5 (semiconductor sample and tip) as a function of the distance d (x) and the incidence angle ($\theta$) for a wavelength of 1$\mu$m and a polarisation parallel to the incidence plane. The intensity (amplitude) is in arbitrary units. It is observed that for the semiconductor case, which is shown in FIG. 4, that a much shorter critical distance ($d_c$) (seen by the steeper slopes in FIG. 4) in the range of 10 nm or less is achievable. This allows higher resolution and more precise control of the tip 172. It may thus be concluded that PSTM is a technique which is particularly well adapted to semiconductor analysis, provided that the probe 17 (or antenna as it is sometimes called) is also made with a semiconductor material (or similar material) and has a high refractive index (n), so as to promote efficient optical coupling. Details of such an arrangement are described below with reference to FIGS. 7a and 7b.

Most PSTM investigations have been devoted to glass or biological like materials (n=1.5). A typical (glass) optical fibre is a very convenient converter. A general view of an experiment is shown in FIG. 5.

Figure 5:
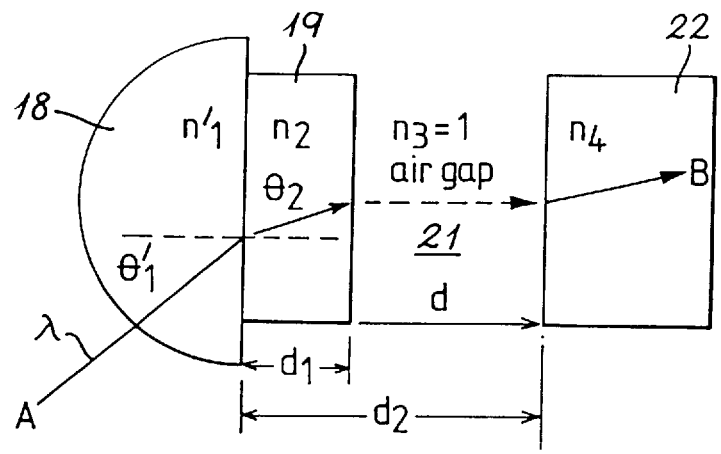
FIG. 5 is a diagrammatical view of a PSTM arrangement illustrating key features.

Referring to FIG. 5, there is shown a prism 18 in optical connection with a sample material 19. An air gap 21 separates sample material 19 from probe 22. A path of a wave $\lambda$ is shown by the arrow connecting points A and B. The intensity recorded in the probe is related to the distance d. Refractive indices $n_1$, $n_2$, $n_3$ and $n_4$, of materials 18, 19, 21 and 22, respectively are indicated as is and the orientation $\theta_1$ of the beam incident. Usually the probe 17 is an optical fibre in which $n_4$=1.5.

An optical fibre 23 is shown in greater detail in FIG. 6 in which like parts bear the same reference numerals as in previous Figures. Optical fibre 23 is tapered by thermal stretching or by chemical etching and it is cladded by a metal coating 24 evaporated under vacuum. An apex 171 is formed by drawing the fibre 23 so that a neck 171, some 20 to 100 nm wide, is produced. The metal coating 24 has also been used to combine an electronic STM operation simultaneously with the PSTM.

The use of a semiconductor, such as silicon nitride (SiN) tip as a probe to make PSTM measurements is described by N F van Hulst et al. in SPIE Conference Los Angeles, 1992, Vol. 1639 pp 36. An experiment is described as using an AFM device and a SiN probe (n=2) to detect an FTIR signal. This experiment effectively combined PSTM measurement with AFM operation.

The techniques described above, representing specific aspects of the invention, show two of the advantages of the invention. The first is that an arrangement of semiconductor tips and integrated detection produces more reliable imaging of surface relief than hitherto possible and thus makes possible the intelligent positioning of a tip at a desired position on the surface of a sample. The second is that the optical guidance properties of the tip permit the parallel passage of a second light beam, (having wavelength $\lambda_2$ different to a first light beam of wavelengths $\lambda_1$), between an external system and a position on a surface of interest. The position on the surface may be specified with nanometric precision. The light beam can pass in either or both directions.

It will now be explained how the invention can be used in technical applications and in particular in the field of nano OEIC technology. Some preferred embodiments are described with reference to Figures.

One embodiment is now described with reference to FIGS. 5, 7a and 7b. In order to provide satisfactory resolution and controllability in PSTM, it is necessary to match the optical indices of prism 18, sample 19 and probe 22, as shown above in FIG. 5. This means that dealing with semiconductor samples requires the use of a semiconductor probe. This can be achieved in a configuration similar to that of AFM tips which already use doped silicon or silicon nitride (SiN) as a transmission material. This particular solution permits optional combination of the probe 22, with an optical guide, a photodiode, an amplifier and even a digital signal processor (DSP) on a single chip or in a compact hybrid structure.

In order to provide a means for convenient collection of photons a semiconductor probe can be arranged with an internal refractive index gradient similar to that of an optical fibre's graded index. Chemical or plasma etching enables the fabrication of semiconductor pyramidal or conical tips or carbon "super" tips with a sharp end of aperture size in the order of 10 nm.

Figure 7A:
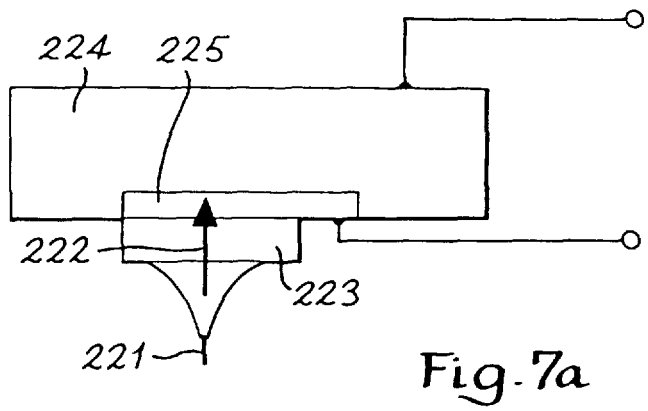
FIG. 7 shows schematic views of an optical path in a PSTM integrated converter using: (A) direct coupling: (B) an inverted photodiode.
Figure 7B:
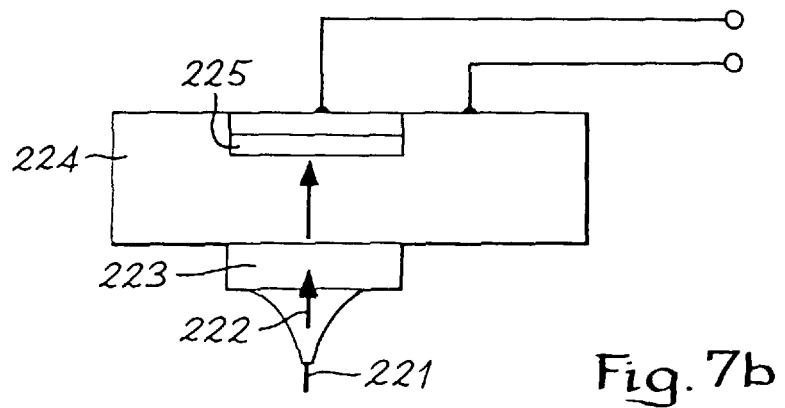
Figure 9:
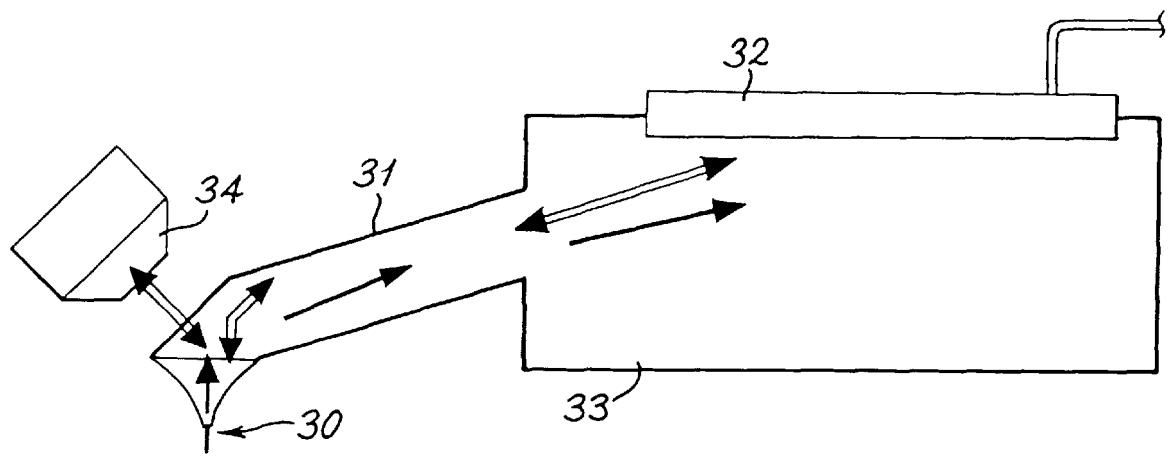
FIG. 9 is a diagrammatical view of a cantilever structure for remote optical micro-connection as part of an intelligent optical sensor of the present invention.

Referring to FIGS. 7a and 7b, an optical coupling 222 for a tip 221 is connected either directly (FIG. 7a) or via a substrate 224 (FIG. 7b) to a photodiode 225. Due to the very high refractive index of semiconductors, such probe tips 221 benefit from a very high collection yield and also a very good confinement and guiding ability for photons in the visible or near infra red region (NIR). These aspects may be improved by the arrangement of an internal gradient index structure. The probe tip 221 can be directly tailored in the substrate 224 material (e.g. silicon or a similar material) or grown in layers of suitably adapted refractive indices. Probe tips 221 can also be provided with a metal cladding (not shown) to prevent stray light capture/loss. The association of the probe tip 221, the optical guide or coupling 222, the photodiode 225 and signal processor (not shown) on the same chip, in very close proximity to one another, guarantees an exceptional conversion yield of the sensor and very good noise and dark current immunity. Materials are transparent to the light to be passed. FIG. 7a shows a tip directly grown on a photodiode 225. FIG. 7b shows a tip arranged remotely from a photodiode 225, which is in an inverted position. Substrate 224 may be semiconductor chip material and may form, or be part of, an optical cantilever as shown in FIG. 9 and described below. A thin film filter 223 is associated with the system to provide wavelength selection.

Figure 8:
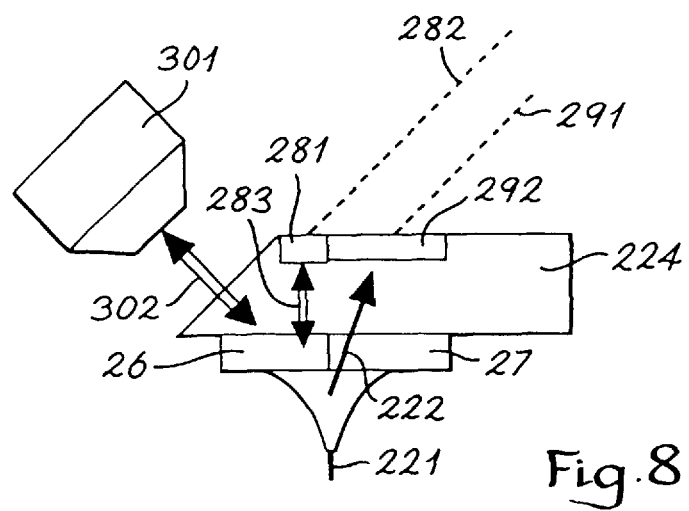
FIG. 8 is a schematic view of an optical connection in parallel with a PSTM optical control.

FIG. 8 shows a more complex OEIC structure which is arranged as a bi-directional optical connector 283. Like parts in FIG. 8 bear the same reference numerals as FIGS. 7a and 7b. Double headed arrows indicate optical connectors, whereas single headed arrows show PSTM control links. The connector 283 ensures that light follow the same path in the probe tip as does the PSTM control beam 222. This is schematically shown in FIG. 8 where double headed arrows denote bi-directional optical connection paths. References 281 and 282 denote respectively optoelectronic transducers for internal and PSTM optical signals. Timing or other forms of discrimination can be provided for light at any wavelength ($\lambda_1$, $\lambda_2$, etc.). Also different paths may be allocated for different wavelengths of light.

Additionally, or alternatively, one or more input(s) and/or output(s) to/from optical beam 302 can be provided by an external coupling 301. The external coupling 301 may be achieved for instance with a lens or an optical fibre (not shown). Light may also be introduced by internal generation (LED or semiconductor laser) of the particular wavelength (s) desired. FIG. 8 shows a function of nanoscopic imaging which the PSTM probe of the sensor also allows. This is the positioning and control of the probe tip 221 in such a manner that optical transfer is achieved with the sample. It is also convenient that at the same time probe tip 221 yields other information, for instance by means of measurement of atomic or lateral forces or electron tunnel current. Optical transfer with a sample may be in the form of a signal path, which may be both to and from the sample. For example an array of microlasers may be tested by establishing a one-way or two-way signal path for optical transfer with a specific microlaser.

A further embodiment is shown in FIG. 9 which shows a remote detection sensor for collection of photons. Collection of photons is provided by a device similar to AFM devices. A probe tip 30 is carried by a side arm (or cantilever) 31 which acts as an optical guide. The side arm or cantilever 31 may also incorporate a beam splitter (not shown) to direct photons to/from opto-electronic integrated circuit (OEIC) 32. A semiconductor substrate 33 couples photons to and from the OEIC 32. The arrangement may be connected to one or more piezoelectric actuators (not shown). An external optical connection 34 is also provided. This may link the device to an optical fibre, a lens or a microscope (not shown).

Figure 10:
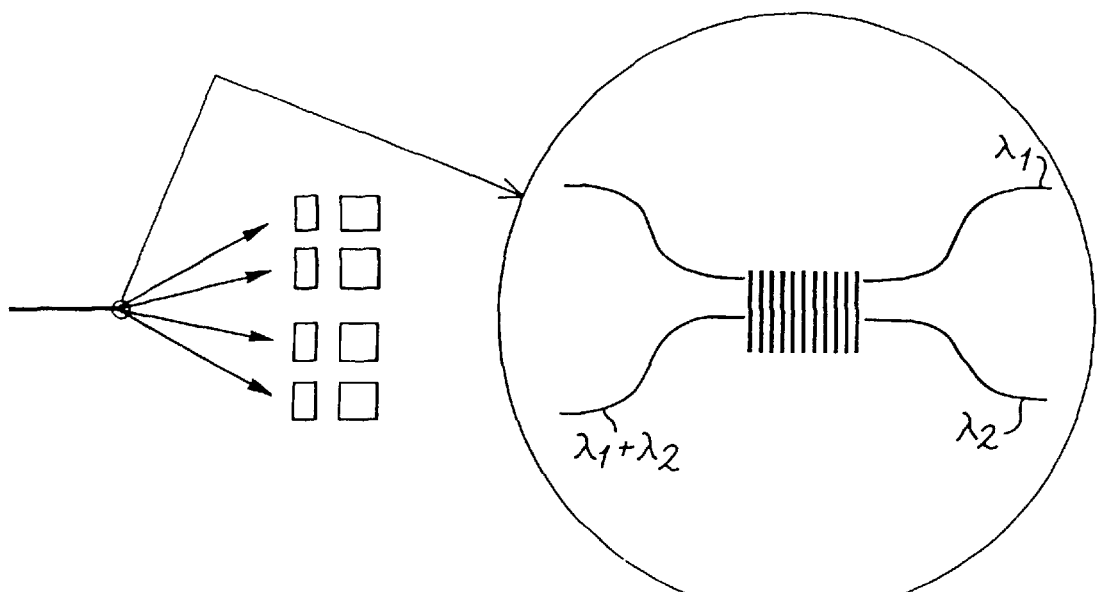
FIG. 10 is a schematic view showing how optical decoupling for demultiplexing can be achieved with an evanescent coupling between light guides.

It is important to select different optical beams at different wavelengths and to direct them to/from their respective circuit. This optical demultiplexing can be achieved classically either by a beam splitter associated with parallel filtered detectors, as shown in FIG. 8, or by evanescent light coupling between integrated guides as shown diagrammatically in FIG. 10.

The structures described above can be fabricated by following conventional semiconductor techniques. The sensor is devoted to several simultaneous tasks: firstly PSTM imaging of a surface or sub-surface; secondly PSTM control of the three dimensional positions of the probe tip at a predetermined location; thirdly simultaneous AFM or STM or any other local measurement; and fourthly collection or delivery of photons at a specified place. It will be appreciated that not all of these tasks may be carried out in a particular device.

An intelligent optical sensor, eg a scanner, is fabricated using conventional micro-electronic techniques. It integrates several functions on the same substrate by using integrated or compact hybrid structures. Structures may comprise a semiconductor to make an AFM or a PSTM distance controller, the latter using a near infra red wavelength illumination $\lambda_1$; and/or an optical sensor located in the immediate vicinity of the probe tip and tuned to the wavelength $\lambda_1$; and/or an electronic amplifier and signal processor which may be digital; and/or a data transfer link for providing the possibility of artificial intelligence; and/or a parallel and wavelength decoupled optical lead, allowing an optical transfer at a wavelength $\lambda_2$ decoupled from a different wavelength $\lambda_1$.

One embodiment relates to an optical device for telecommunications and optical computers. Optical systems are especially well adapted to the parallel nature of data processing involved in telecommunication devices or optical computers. Such matrix organisations of surface devices require small but numerous identical nanometric components such as modulators, bistable resonators or surface emitting lasers. These are intended to be key devices for signal communication (asynchronous time multiplexing) or programmable arrays of optical memories.

An aim of the present invention is to provide a means, including but not limited to method and apparatus, for inspecting and for individually testing the components in position and/or programming such complex systems of surface nanodevices.

A second embodiment relates to the replication of surface devices on a large scale of integration where it is mandatory to satisfy good reproducibility of morphologies. For instance, surface emitting lasers require a precise patterning in order to achieve a rejection of lateral modes. Nanolithography usually performed by electron beam X-rays or focused ion beam (FIB) require precise control, as do the transfer technologies such as lift-off, reactive ion beam (RIE), localised implantation and diffusion. For instance quantum wires are known to be affected by residual resin molecules which induce limit fluctuations in the dimensions.

A further aim of the present invention is to contribute to the prevention of such defects by providing means, including but not limited to method and apparatus, for optical detection and local operation.

A third embodiment relates to new mesoscopic devices which have recently been developed such as mesoscopic metal rings, interferometers, Josephson diodes, Coulomb blockade structures, single electron transistors or even magnetic SQUIDs, or microstructures using high $T_c$ (Curie temperature) conductors. All these require micromachining, microcontrol and more essentially a microconnection (e.g. microcavity optical resonators) for their relation with the external world.

A yet further aim of the present invention is to provide means, including but not limited to method and apparatus, for new experimental physics at a nanoscale of quantum electronics.

Such a complex arrangement has to be automated as far as possible. Corresponding signal and data processing has to be designed and specialist software programmed for each case, as will be appreciated by a skilled person. This may require remote computer processing, even if some low level control and feedback is being operated on specified Digital Signal Processing (DSP) integrated on the chip. Such signal processing can be obtained from the usual computer techniques of image processing, data fusion, fuzzy logic so as to make the sensor expert and "intelligent".

The sensors described above are able to collect (or emit) photons with a very high spatial precision in order to bring about a high resolution optical connection. The sensor uses an Atomic Force Microscope (AFM) standard tip to guide photons to or from a precise location on a surface to or from an optoelectronic detector or emitter. The detector or emitter may be equipped with associated electronic circuitry dedicated to signal processing such as amplification, digitization, digital processing, or other types of artificial intelligence. Brief reference will now be made to FIGS. 11 to 17 and to various manufacturing techniques of the sensors.

Standard AFM tips currently fall into two categories. Firstly silicon oxinitride (SiN) pyramids which are obtained by Organo-Metallic Chemical Vapour Deposition (OMCVD) into a Silicon mould. This is depicted diagrammatically in FIG. 11. Secondly Silicon tips have very sharp features which may be obtained by chemical or plasma erosion.

Contrary to previous opinion, SiN walls of pyramidal tips used in AFM are able to convert an evanescent wave at its surface into a propagating mode of photons which conserves the photon's momentum direction. This particular property makes it possible to selectively guide photons towards or away from different optical detectors by means of different optical paths. One such example in the path corresponding to different arms of a cantilever 40 which supports a tip 42 in the form of a pyramid. The intelligent optical scanner may then be split into a multichannel bidirectional sensor, namely a double channel system, may be easily organized through the two arms using standard tips. An example is shown diagrammatically in FIG. 12.

Figure 11:
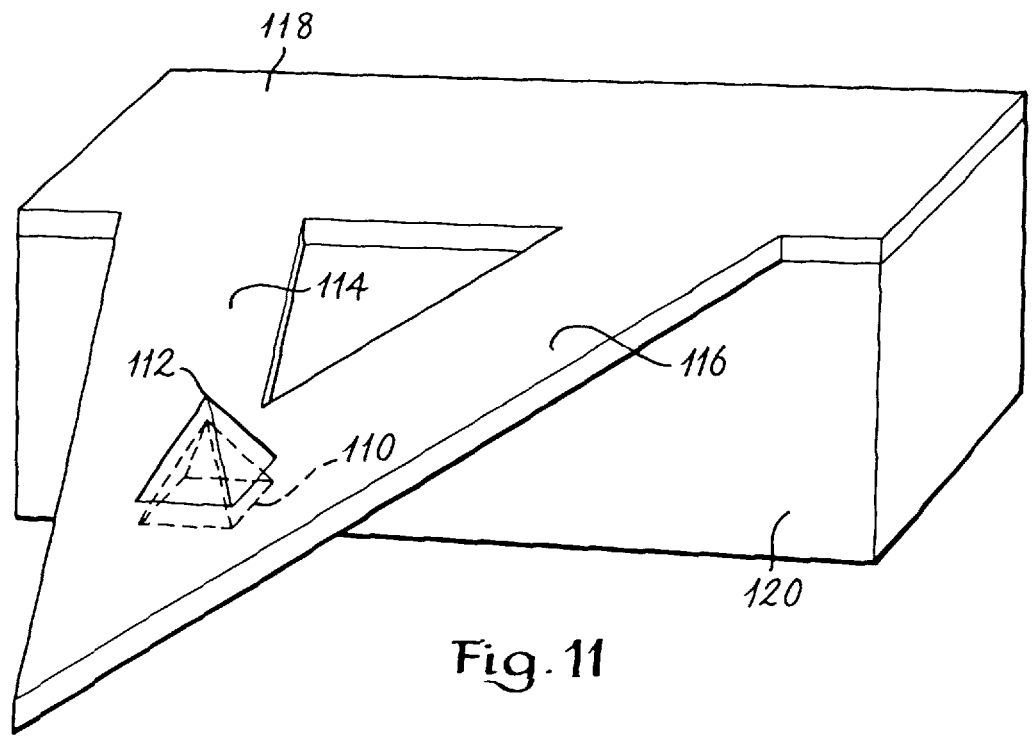
FIG. 11 shows a perspective diagrammatical view of an alternative embodiment of the sensor.

FIG. 11 shows general features of an AFM probe 110 which has been formed from a SiN layer. The probe 110 has a tip 112 which is placed at the end of a two arm 114, 116 cantilever 118. The cantilever 118 Is stuck to a substrate 120 using a suitable adhesive. The substrate (not shown) may be PYREX (Trade Mark) material.

The pyramidal shape of the probe tip 110 is obtained by the following steps:

i) a silicon wafer is equipped with a mask (not shown) with limiting square windows (typically 5$\mu$m wide). An etch is performed which selectively reveals the [111] planes thus creating a pyramidal hollow, whose internal face angle is 57°.

ii) resin is removed and the silicon surface is covered with a SiN thin film layer (typically 0.8–1$\mu$m thick) where cantilever 118 is patterned. The pyramidal hollow behaves as a mould. The walls of the mould are coated with the SiN layer.

iii) A PYREX (Trade Mark) substrate is stuck onto the external face of the pyramidal mould, as a sample holder and then the Silicon substrate is dissolved chemically.

Figure 13:
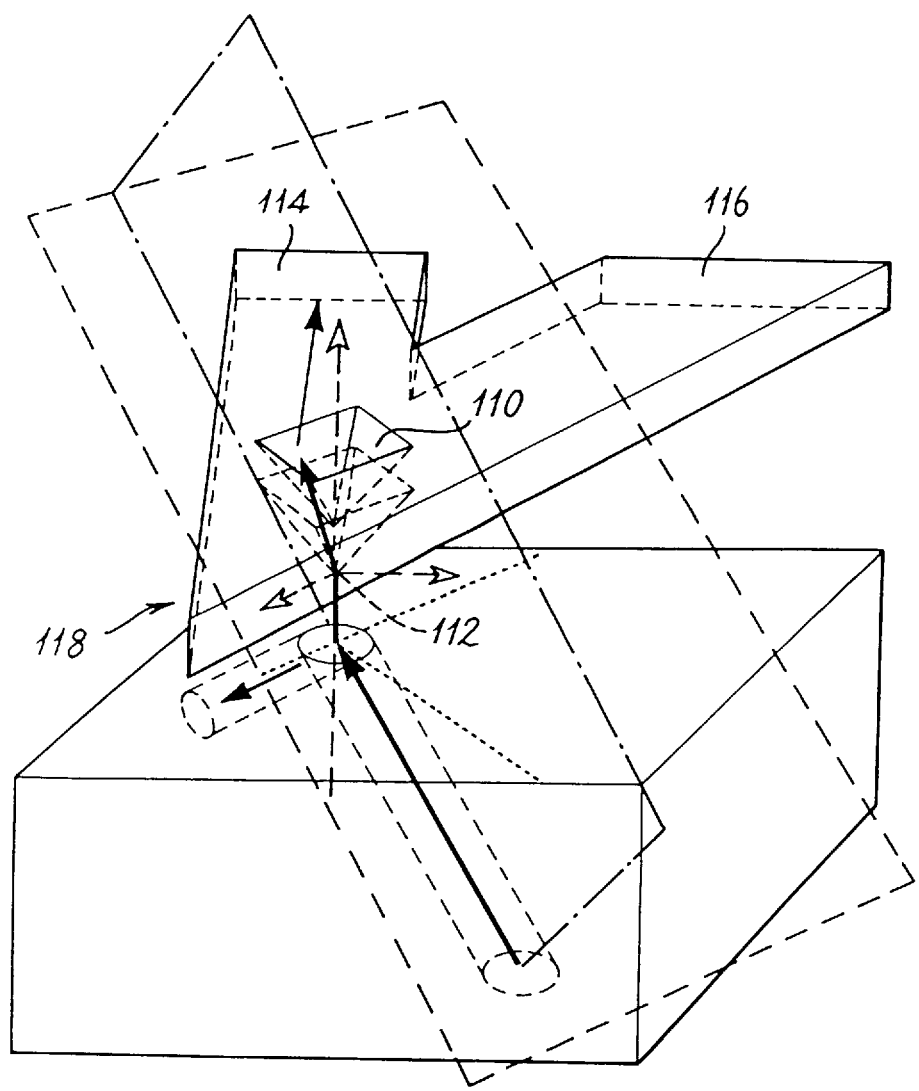
FIG. 13 is a perspective view showing diagrammatically intersecting planes of interest.

In recent work the inventor has performed a Photon Tunnelling Microscopy experiment, shown in FIG. 13, in which like parts bear the same reference numerals, using an AFM SiN tip, (fabricated according to the above steps) as a photon converter. It was already known that such a tip was able to convert an evanescent wave into a propagating mode emerging from rearface of a cantilever 118 in a perpendicular direction. The inventor has discovered that a guided mode was also present in the tip 112 walls, such that a strong emission mode was noted from one side of the cantilever 114. This was approximately in the initial direction of the beam and also through the lateral face of the cantilever 118. This feature of the invention which uses the directional guiding property to transmit photons in the tip 112 selectively to one or other side arms 114 or 116 of the cantilever 118, (depending on the initial direction of the incident photon), enables the tip 112 to behave as a double channel transmission system. The optical transmission of each channel (or arms) 114 or 116 is bidirectional.

Light emission from the tip 112 to substrate 120 can be made as well as its collection in the reverse process. Similarly such a sensor can be made with more than two channels even if desired. The aim is to guide collected photons dominantly towards the arms 114 and 116 of the cantilever 118. This means that the incident beams have to be conveniently directed, in the substrate 120, in such a way that they could be transmitted into a corresponding tip wall in a convenient direction. For a better yield of transmission and limitation of lost light, it is advantageous to arrange the orientation of the probe tip as shown in FIGS. 13 and 14.

Figure 14:
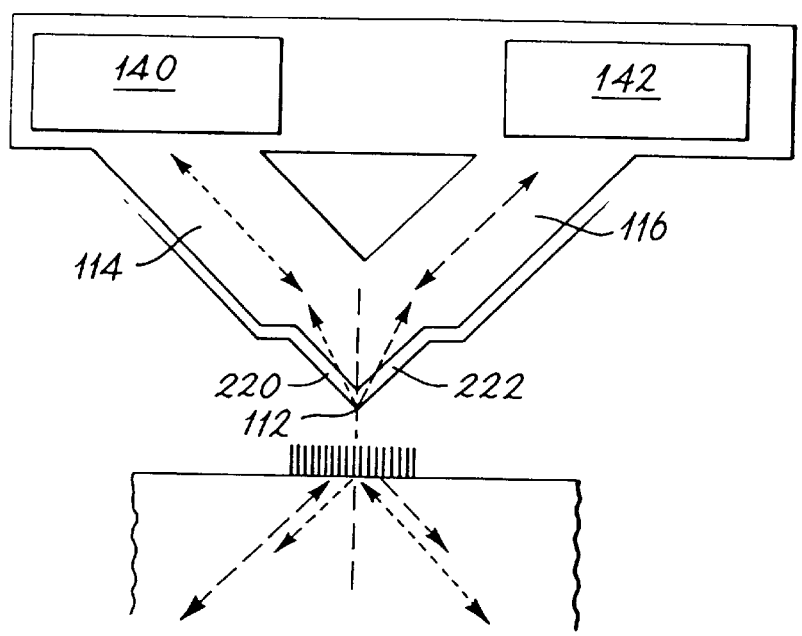
FIG. 14 is a simplified diagram, illustrating a two-fold optical path using the two arms of the cantilever.

A possible realisation is shown in FIG. 14. In this arrangement the tip of the pyramid has been rotated through 90° in a direction horizontal plane perpendicular to the plane of the Figure, of the pyramid in order to direct the walls 220 and 222 equally towards the right 116 and the left 114 arms of the cantilever which will make the guiding operation easier. In this realization both arms 114 and 116 play the role of independent optical guides between the tip and the optoelectronic independent integrated circuits 140 and 142 emitters as well as detectors.

The arrangement in FIGS. 13 and 14 makes it possible to establish an optical connection through the tip 112 using two (or possibly more) independent bidirectional channels thus allowing multiplexing of parallel optical links between the nanoscopic and the macroscopic world. For instance one channel may be used for tip position control, whilst the other channel is used simultaneously to transmit information, possibly even at the same wavelength, i.e. $\lambda_1 = \lambda_2$.

Scanning Tunnelling Optical Microscopy (STOM) solves the problem of obtaining information from a surface and subsurface of transparent materials. A light beam introduced into the material and totally reflected internally (TIR) at the surface provides a non propagating evanescent wave on an external side. A dielectric probe may then be placed in the near field region, as shown in FIG. 1, and atomic coupling with this electromagnetic field gives rise to a propagating mode in the dielectric medium of the probe. The reflection is said to be "frustrated" (FTIR). Usually the probe is simply a tapered glass optical fibre as shown, for example in FIG. 6. More recently van Hulst et al. and others, have reported the use of Silicon Nitride (SiN) Atomic Force Microscopy (AFM) stylus to collect an evanescent field. Such probes conveniently perform a smooth approach to the sample surface because they are carried by a flexible cantilever. At the same time the relatively high refractive index (n=2.1), and the transparency of the material from which they are formed, provide satisfactory transmission of light.

Commercially available pyramidal (SiN) AFM tips make it possible to perform the PSTM experiment with a spatial resolution of 50 nm or less and to obtain AFM data during the same scan. An experiment for such a system is described below.

Figure 15:
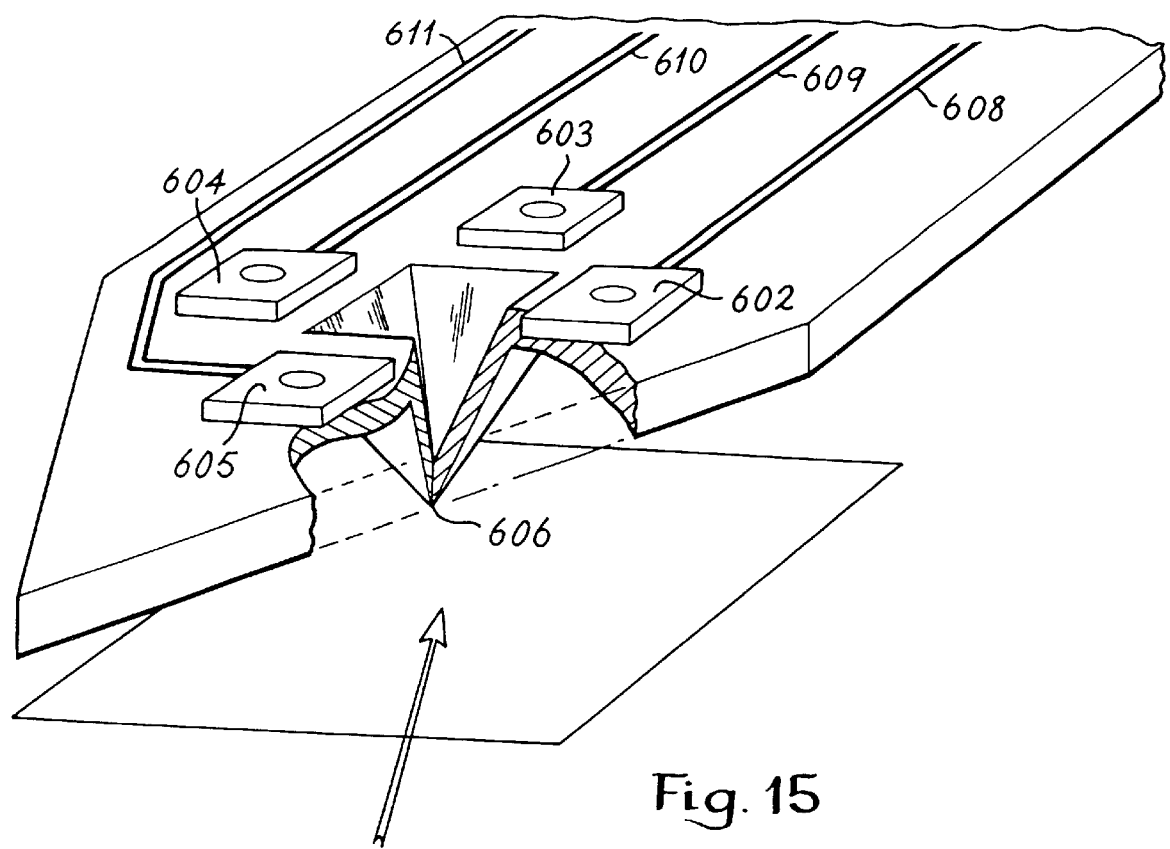
FIG. 15 is a diagrammatical perspective view of a bidirectional four-fold optical coupler for incorporating integrally with the sensor.
Figure 16:
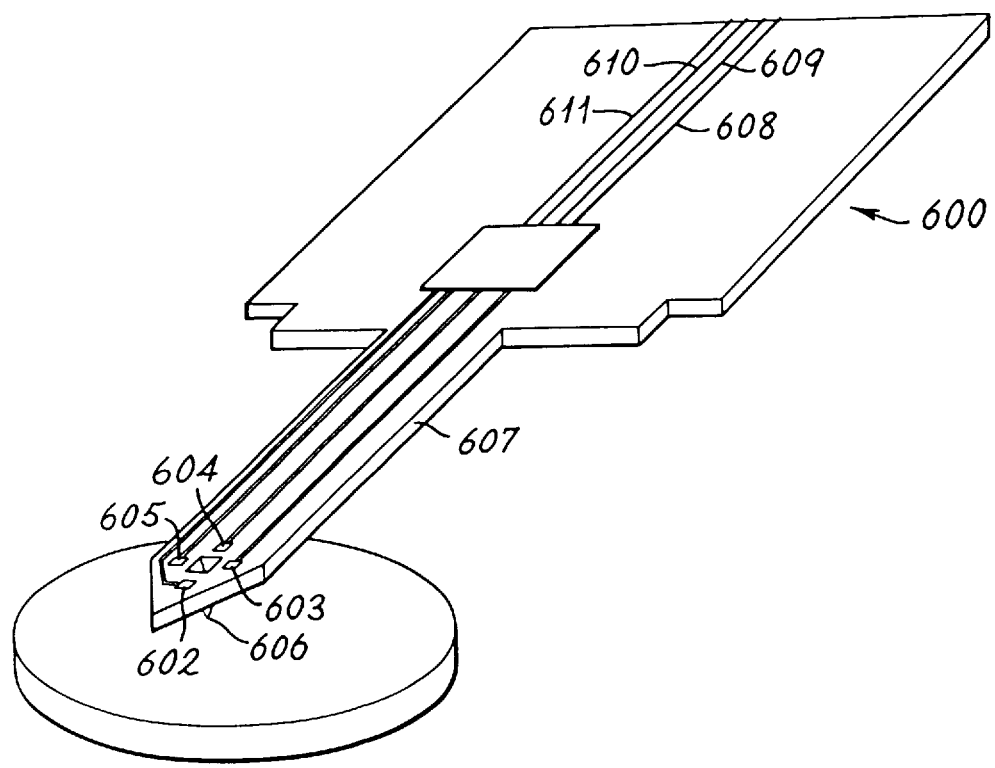
FIG. 16 shows a perspective view of the coupler of FIG. 15 connected to a Digital Signal Processor (DSP)

Another embodiment of the invention is one having only one arm, and a four channel, bidirectional coupler 600 and is indicated generally in FIG. 15 and in greater detail in 16. Four small OEICs 602, 603, 604 and 605 (light detectors or emitters, as well) are placed close to the tip 606 in such a way that they are on optical paths corresponding to each of the four walls of pyramidal tip 606. There is sufficient space to place such devices at the end of cantilever 607 which may comprise a single or multi arm device. In this configuration the or each arm is not used as a light guide, but its role is to carry a bundle of electrical connections 608, 609, 610 and 611 or as well a combination of both optical and electrical connections.

The electrical leads from the OEICs 602, 603, 604 and 605 to the substrate circuit which may be a DSP or to a connection to external devices can be obtained using evaporated metallic or ion implanted conducting lines. Such an optical coupler benefits from four independent optical paths allowing for example multiwavelength, simultaneous PSTM or any combination of optical connections as described above. Other appliances which may be connected include local photoluminescent devices (excitation plus detection) and/or optical tools for biology such as imaging, optical tweezers or scissors.

Optical cross talk between channels may be limited by convenient optical barriers in the bulk of the material forming the or each arm. These include trenches, implantation of ions inducing absorption of photons or optical index changes.

Optical and electrical circuits of such an intelligent sensor may be coupled with the piezoelectric self control of the flexion of the cantilever arms.

Figure 17:
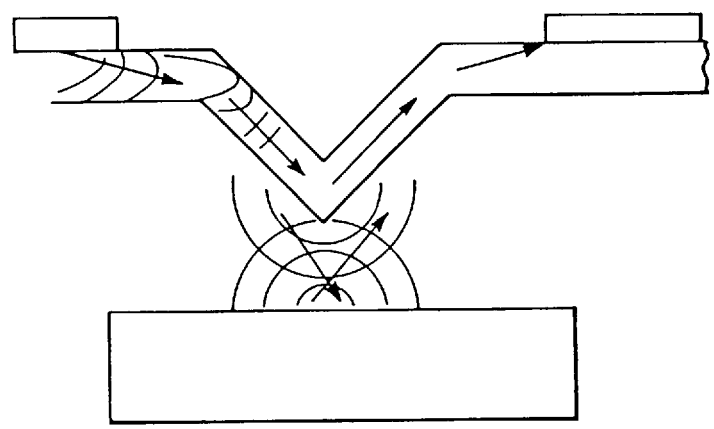
FIG. 17 is a diagrammatical view of an additional, optional channel, suitable for use with the sensor of FIGS. 15 and 16.

Light may be provided by one or more of the channels and can be reflected by the surface of the sample and then again captured by another channel as sketched indicatively in FIG. 17.

The above configurations can be effective in many various situations such as optical near field microscopy, high density data storage, nanotechnologies, optical communications and optical computers.

The evanescent near field intensity in the free space above a flat surface of a dielectric is traditionally described by the exponential formulation:

$$I(d) = I_o e^{-(d/d_c)} \quad \text{Eqn. 1}$$
$$= I_o e^{-(d/d_c)}$$
$$d_c = \frac{\lambda}{4\pi} \frac{1}{\sqrt{n^2 \sin^2\theta - 1}} \quad \text{Eqn. 2}$$

where d is the distance to the surface and is a critical distance; $\lambda$ is the wavelength, n is the refractive index and $\theta$ is the internal incidence angle.

The physical situation of PSTM is more complex than suggested in Eqns. 1 and 2 because of several perturbations.

Figure 18:
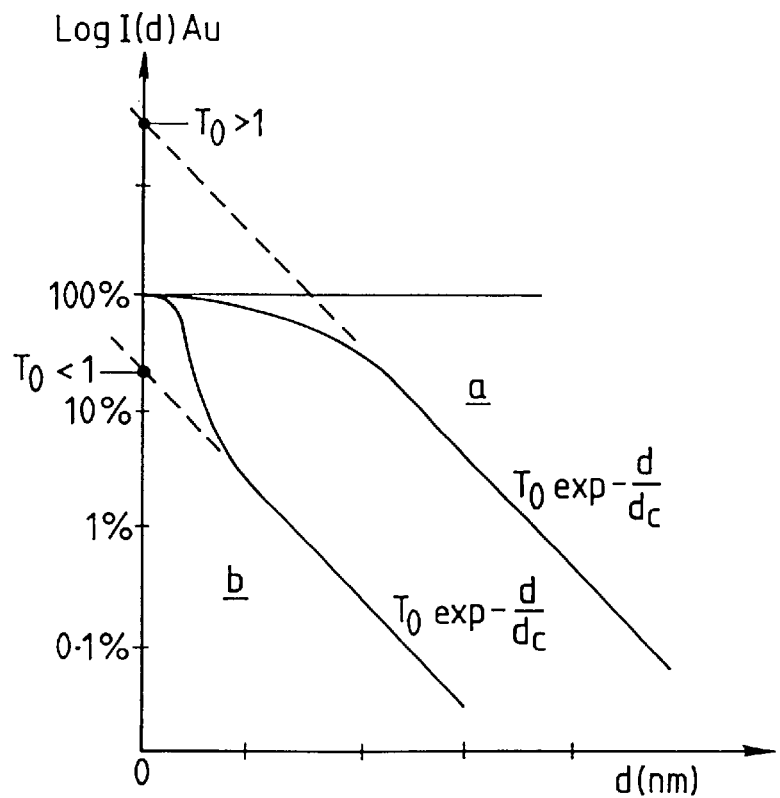
FIG. 18 is a semi-logarithmic graph of intensity (I) against distance (d) of a three medium refraction model, regions -a- and -b- corresponding to different angles of incidence.
Figure 19:
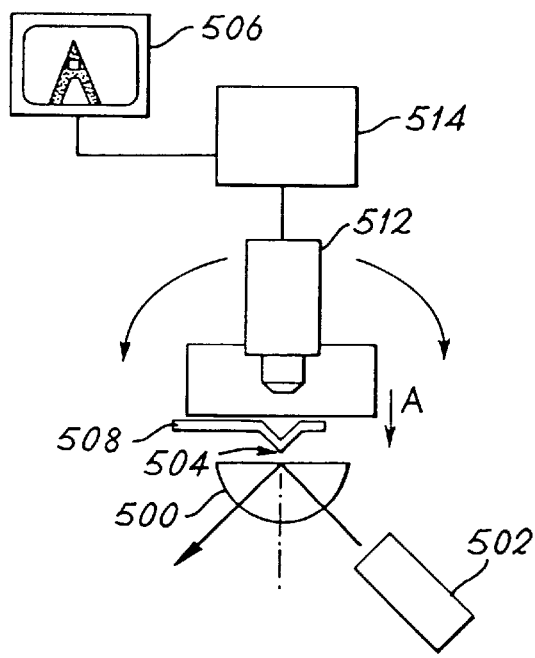
FIG. 19 is a diagrammatical sketch of an experimental arrangement incorporating an alternative embodiment of the invention.

The presence of a third medium for photon collection in the near field close to the surface, introduces a deviation to the exponential regime. The intensity of a reconstructed propagating wave can be calculated by means of Maxwell equations in the case of infinite plane surfaces. In this case also the exponential asymptotic regime can be observed (as seen in FIG. 18) at a large distance ($d>d_c$) if detection is sensitive enough. The initial value $T_O$ may be extrapolated from a semilog plot, its value can be larger as in curve (a) or smaller curve (b) than 100% depending on n, and on the polarization as has been shown in computer simulations.

It has also been established that relief corrugation can lead to very complex three dimensional combinations of the evanescent field and also to spurious propagating modes at places where the critical incidence for TIR is not respected. To avoid such difficulties it has been assumed that surfaces are satisfactorily flat.

The shape and the size of the probe tip has to be considered. The tip is a subwavelength object which is far from the infinite plane approximation. Nevertheless it has been shown that the deviation of experimental results is generally not as dramatic as may be expected. All these restrictions being considered, the capture of the evanescent wave by a dielectric tip classically suggests two different explanations. Firstly the tip is considered as a plane dielectric interface obeying the set of macroscopical Maxwell equations. Secondly the tip is considered as a subwavelength scattering particle (Mie dipolar scattering) in which isotropic emission (near and far field) is partly collected in the apex of the tip. These different situations in fact are not so clear cut and occurrence of other unknown phenomena have been recently invoked to explain non consistent experimental results.

Figure 12:
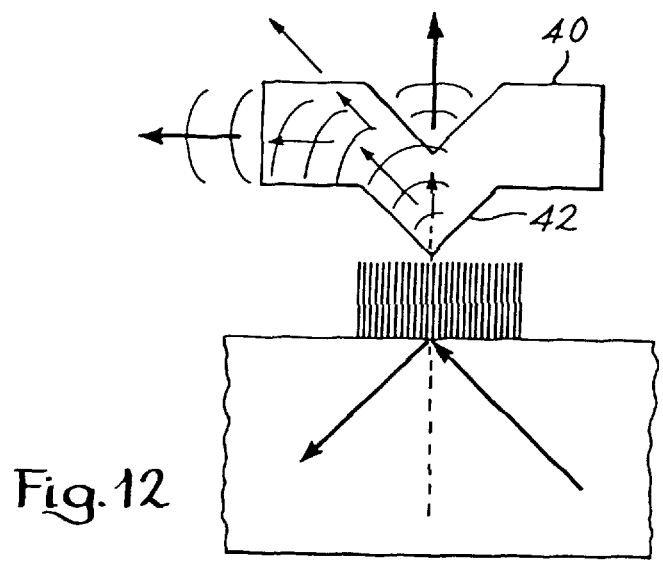
FIG. 12 shows a section through the alternative embodiment, shown in FIG. 11, in proximity with a surface of a specimen.

The experimental arrangement shown diagrammatically in FIG. 12 involves a semicylindrical glass prism 500 (n=1.517) of which the surface is directly taken as a sample under test. Light is provided by a HeNe laser 502 ($\lambda$=0.633 $\mu$m and 1.5 mW) and pyramid tip 504 is standard SiN production from the TOPOMETRIX company.

Although the PSTM technique was initially invented to give super resolution relief mapping, it appears that very strong disturbances occur in the near field with relief corrugation. In the present case great care has been taken to verify that the surface was sufficiently flat, given experimental circumstances.

Phase Stepping Microscopy (PSM) images, shown at VDU 506 were obtained from the prism 500 surface. These show that observed relief features give a height to length ratio larger than 100, which is a convenient range to keep clear of PSTM propagating mode artefacts.

Face angles of hollow tip 504 pyramid are 55°. The thickness of a CVD SiN layer is 1 $\mu$m. Spring constant of cantilever 508 is 0.064 N/m and the tip radius is less than 50 nm. AFM probe is adhered onto a sample holder associated with a piezoelectric actuator, indicated by arrow A, at an angle of 15°. The rear of the tip 504 is observed with a CCD camera 512 without an automatic gain control. The camera 512 was carefully calibrated. Image processor unit 514 allows data to be obtained.

The incidence angle E was chosen to be $\lambda$=46° in order to be in excess of the FTIR limit but also to be small enough not to induce spurious scattering from the surface and to keep a high laser intensity on the surface. The corresponding attenuation length is $d_c$=265 nm. Two experiments were performed. These are described below.

The first experiment relates to the transmitted intensity as a function of tip/surface distance. Piezoelectric actuator allows displacement of the tip with respect to the prism, but the exact tip to sample distance depends upon several uncontrolled parameters. These include: piezoelectric element hysteresis; cantilever flexion, induced by Van der Waals forces; electrostatic charges; and/or radiation force of the evanescent wave. Nevertheless it is expected that such pertubations, which could be large in the distance range of 0–50 nm, do not appreciably influence slope measurement at a distance of d>250 nm.

Each set of measurements was performed by approaching the tip to the surface. After touching the surface of the prism 500 tip 504 sticks to a water film (not shown) and an effort is required to remove it. The objective (×3.2) is placed at a distance such that its aperture is observed from the rear side of the tip 504 at an angle of less than 20°. The magnification allows an image of the base of the pyramid supporting tip 504, to be obtained (4×4 µm) over an Area Of Interest (AOI) of 3×3 pixels. The intensities (256 grey levels) were integrated. Dark current off-set is classically obtained from a large distance plateau and is deduced from data to give the actual intensity.

An advantage of collecting transmitted light with a remote camera instead of an optical fibre essentially relies on long distance operation which prevents interferences occurring between the tip 504 and a CCD sensor. This also provides a narrower angular resolution of observation.

The second experiment required the camera 512 to be rotated in the incidence plane, about the tip 504, in order to keep it focussed on the centre of the image, thus maintaining a constant distance between the tip 504 and the camera 512. The ratio of flux of the Poynting vector on the camera sensor (0° direction) to that of the laser 502 at the prism surface 500 has been found to be $1:10^5$. The laser 502 at the prism surface 500 conveniently indicates a collection cross-section in a range of $(50)^2$ nm$^2$ at the tip 504 of the pyramid. The maximum rotation angle which is achievable on both sides by the camera is 60°.

The amplitude of the extrapolated exponential shift $T_O$ was calculated. In the present case using the refractive index n=1.517 in the prism 500 which is different from that in the probe tip 504 where n'=2.1. The calculation was modified, eventually giving the formula expressed in Eqn. 3 below.

dielectric capture, even if the distance scale is not exactly in the range of d>50 nm. This is due to the above mentioned reasons of cantilever flexion. It is also worth observing that the s polarization should certainly not be confused with the actual results.

Figure 21:
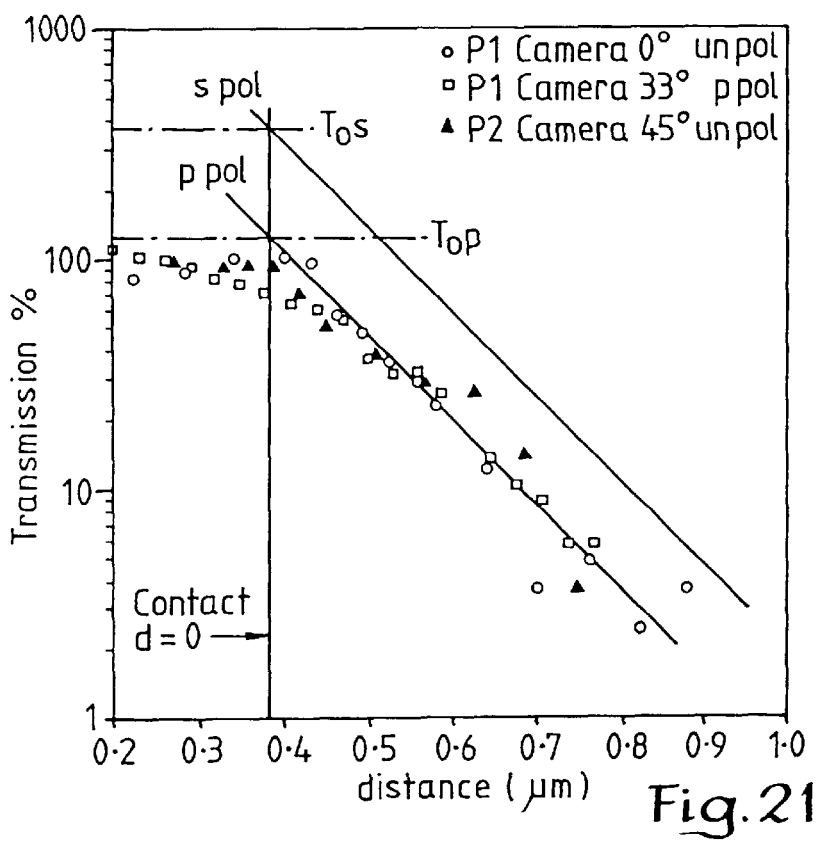
FIG. 21 is a semi-logarithmic graph of intensity (I) transmitted by probe tip, against distance (d)

FIG. 21 also shows results obtained with the camera 512 rotated 33° and 45° counterclockwise (towards the beam). A strong increase in the transmission is noted when the camera 512 is rotated and the distance dependence is again measured. The variation of the intensity with the distance still remains unchanged. This demonstrates that the light does not emanate from a stray capture, but from the FTIR operation in the tip 504. A likely explanation is that it is the inner walls of the tip which guide captured light until it reaches the outside surface of the cantilever as shown in FIG. 22.

Figure 22:
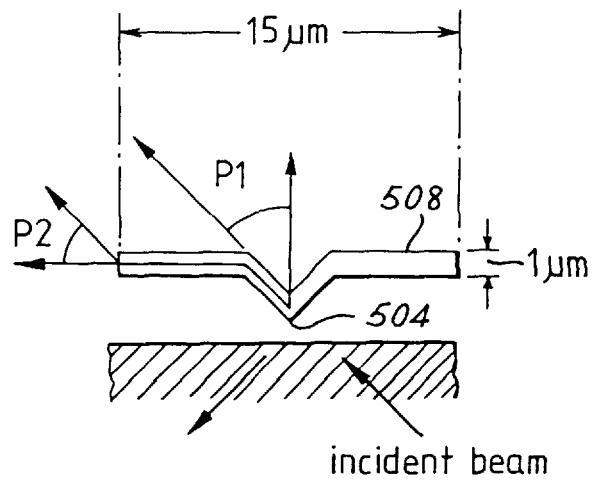
FIG. 22 is a diagrammatical sketch showing light capture and guidance by the cantilever.

Another observation for such positions of rotation of the camera 512 is the appearance of a second bright point (P2) located on the edge of the cantilever in the incidence plane as indicated in FIG. 22. This source of light is only active for the s polarization and its intensity varies with the distance as expected. The light source corresponds to photons which are guided in the cantilever 508 from the tip to the left section.

Figure 23:
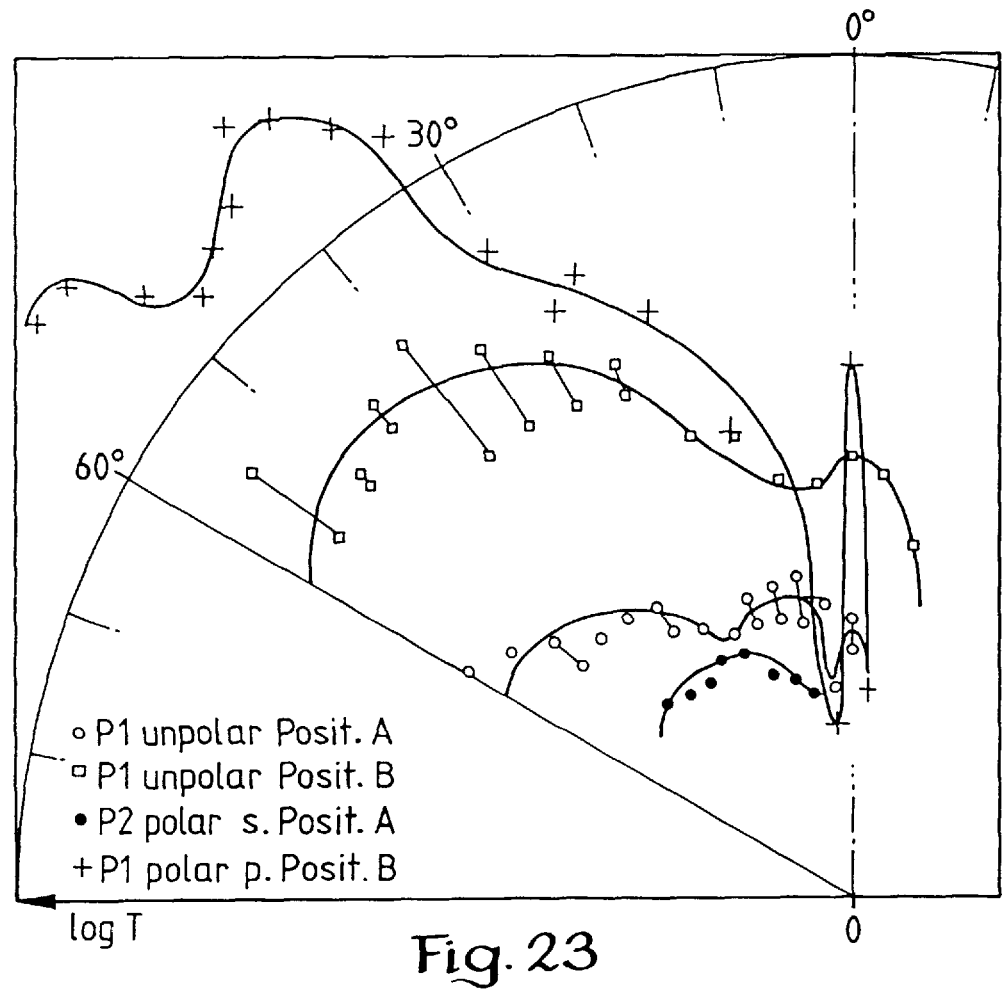
FIG. 23 is a logarithmic polar plot for points P1 and P2 in which A(d~0) and B(d=200 nm) for a variety of polarisations.

Angular dependence of transmitted light occurs when the camera 512 is rotated both sides from the 0° position. Both points P1 and P2 disappear from the right side (clockwise) whereas P1 becomes brighter for the left side and the point P2 appears. The results are shown in FIG. 23 in an angle $$T_{Os/p} = \frac{16\,(nn')^p \cos\theta(n^2\sin^2\theta - 1)\sqrt{1 - \left(\frac{n}{n'}\right)^2 \sin^2\theta}^{\,2}}{\left\{\left[n^p\cos\theta + n'^p\sqrt{1 - \left(\frac{n}{n'}\right)^2 \sin^2\theta}\right]^2 (n^2\sin^2\theta - 1) + [n^2\sin^2\theta - 1] + \left[n^2\sin\theta - 1 - (nn')^p\cos\theta\sqrt{1 - \left(\frac{n}{n'}\right)^2 \sin^2\theta}\right]^2\right\}} \qquad \text{Eqn. 3}$$

where ρ=±1 depending on the s or p polarisation respectively.

Figure 20:
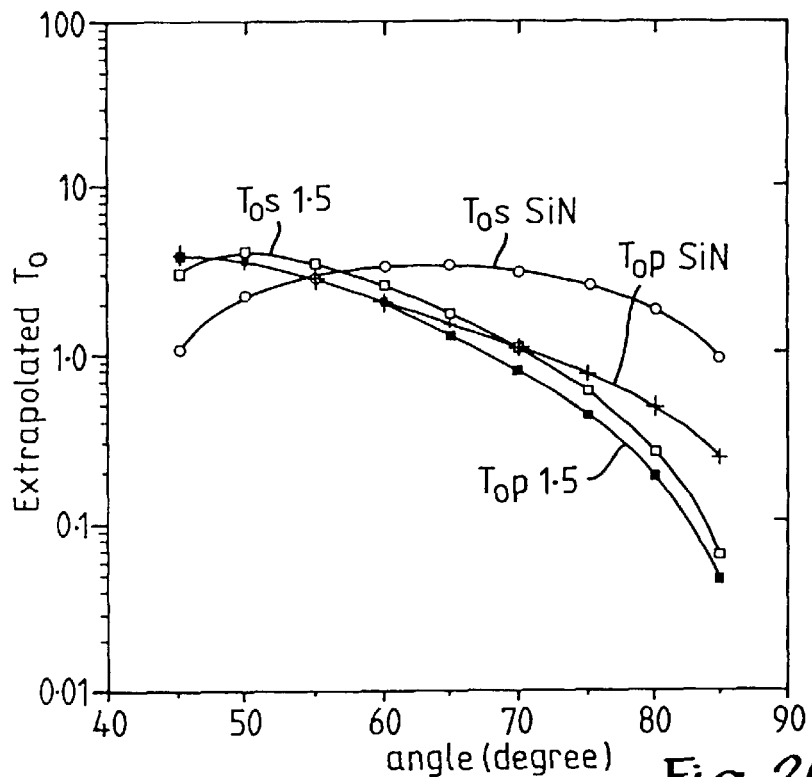
FIG. 20 is a graph of extrapolated exponential shift (To), against angle incidence (θ) for s and p polarisations, wherein n−n'=1.5, b) n=1.517; n'=−2.1.

It is observed from the graph in FIG. 20 that the high index in the probe appreciably changes the coefficient $T_O$ for both polarizations. Some changes can be foreseen in the 1(d) curves in the region $O<d<d_c$, even if longer distance logarithmic slope still remains unaffected.

In intensity dependence observation with respect to distances, the camera 512 was placed at 0° above the tip 504. The distance d is varied and the image is recorded. Back face of the cantilever 508 shows a bright point, referred to below as P1, at the tip position. The low magnification does not allow determination of whether the light emanates from the centre of the hollow or from the side walls. It was also found that p polarization gives a much brighter transmission than the s one.

The data was normalized to a 100% level corresponding to the optical contact (d=0). They are shown in a semilog plot in FIG. 21 on an arbitrary distance scale. It was observed that the theoretical slope ($d_c$=265 nm) conveniently agrees with experimental data. The Top level, placed in the graph, allows the position of the d=0 point to be determined on the distance scale. In order to place other data from different experiments in the same graph, a similar operation was performed on the data and each plot was shifted laterally to bring asymptotic slopes into coincidence, thus establishing a common origin (d=0) at a fixed point on the distance scale.

Good agreement is found with computed predictions with the classical refraction model, macroscopical semi-infinite diagram. Two series of measurements are made corresponding to two different tip/sample distances (A:d~200 nm B:d~o) and for different polarization conditions.

In addition to the axial emission P1 shows a large lobe in the direction 40°–60° which corresponds to the wall direction (25°–35°) corrected from the refraction. The p polarization is preferentially transmitted over all of the angular domain. Likewise P2 does not display an axial emission but a large lobe increasingly intense at high angles. In the latter case the p polarization is not transmitted likely due to internal reflections.

From the above observations a first conclusion is that the transmitted photons emanate from the conversion of the evanescent waves in the tip 504. The distance dependence corresponds fairly well to usual macroscopical model of refraction. A second point is that lateral transmission only, in the left side wall, indicates that the photon momentum is satisfactorily conserved in the tunnel effect experienced by the photons. It can then be deduced that the tip conversion does not involve a dominant point scattering mechanism, which should be isotropic. This point could not have been directly revealed with a uni-directional cylindrical optical fibre.

It is also worth noting that the preferred direction of the propagating modes, created in the dielectric stylus, is the same as the direction of the radiation force experienced by subwavelength objects placed in an evanescent radiation field. This preferred direction of photon momentum is also typical of the refraction model in spite of the subwavelength size of the tip 504.

The intensity of the light transmitted by an SiN AFM probe used in a PSTM configuration has been observed at various angles of transmission. It has been shown that in addition to an axial lobe of intensity, a strong intensity also appears in the direction of the tip walls and selectively on the side which is orientated along the beam direction. The dependence of these intensities with the distance is in agreement with the macroscopic model of capture of a plane evanescent wave by a semi infinite dielectric medium. The scattering contribution of the tip seems negligible in this experimental situation. It is also observed that the propagating modes are efficiently guided by the walls of the tip to the lateral edge of the cantilever 508.

It will be appreciated that the above embodiments have been described by way of example only and variation to them is permitted within the scope of the invention. Examples of these include arrangements described in the following paragraphs.

These arrangements include an optical device described in the following two principal paragraphs as modified by arrangements described in one or more of the following paragraph(s).

An optical device may include a cantilever supporting a probe, the probe and cantilever having an optical path, at least part of the path to capture an evanescent wave and extending to a tip of the probe, the path also extending to an external connection of the device.

An optical device may include a cantilever supporting a probe, the probe and cantilever having an optical path, at least part of the path to convey a longitudinal wave and extend to a tip of the probe. The path also extends to an external connection of the device.

We claim:

1. An optical sensor comprising:
   a light source of a predetermined wavelength;
   a probe having a tip, said tip having dimensions which are small with respect to said predetermined wavelength for capturing light from the light source from a surface of interest in the near field region of said tip, and said tip having walls for guiding the captured light;
   a cantilever supporting said probe;
   a first detector integrated on a substrate, said first detector being arranged to receive the light guided by a first wall-of said tip in the direction of said first wall, and an external connection receiving light by a second wall of said tip in the direction of said second wall.

2. An optical sensor according to claim 1 wherein said probe is made from a semiconductor material which is transparent at the predetermined wavelength.

3. An atomic force microscope comprising a sensor according to claim 1 including means to control the position of said tip with respect to a surface of interest, said means comprising an analog to digital converter and a digital signal processor connected to said digital converter and wherein said substrate comprises an amplifier connected to said digital converter.

4. A scanner comprising a sensor according to claim 1 and means to control the position of said tip for delivering and/or detecting an optical signal at a predetermined position and at a predetermined time.

5. An optical sensor according to claim 1, further comprising an analog to digital converter and a digital signal processor connected to said digital converter, and wherein said substrate comprises an amplifier connected to said digital converter.

\* \* \* \* \*